(12) United States Patent
Hillery

(10) Patent No.: US 11,379,008 B2
(45) Date of Patent: *Jul. 5, 2022

(54) MOBILE DEVICE WITH FLEXIBLE DISPLAY AND HOUSING

(71) Applicant: Thomas H. Hillery, Henderson, NV (US)

(72) Inventor: Thomas H. Hillery, Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,803

(22) Filed: Oct. 1, 2020

(65) Prior Publication Data

US 2021/0092212 A1 Mar. 25, 2021

Related U.S. Application Data

(63) Continuation of application No. 16/358,566, filed on Mar. 19, 2019, now Pat. No. 10,831,239.

(51) Int. Cl.
*G06F 1/16* (2006.01)
*G06F 3/041* (2006.01)
*H04M 1/02* (2006.01)
*G01L 1/00* (2006.01)

(52) U.S. Cl.
CPC .............. *G06F 1/1652* (2013.01); *G01L 1/00* (2013.01); *G06F 1/1643* (2013.01); *G06F 3/0412* (2013.01); *G06F 3/0416* (2013.01); *G06F 3/04146* (2019.05); *H04M 1/0268* (2013.01)

(58) Field of Classification Search
CPC ........ G06F 3/0414–04142; G06F 2203/04102; G06F 2203/04105; G06F 1/1652; G06F 1/1616; G06F 1/1626; G06F 1/1656; G06F 1/1637; G06F 3/0412; G06F 3/04146; H04M 1/0268; G01L 1/00
See application file for complete search history.

(56) References Cited

U.S. PATENT DOCUMENTS

2013/0307816 A1* 11/2013 Lee .................. G06F 1/1684
345/174
2015/0370317 A1* 12/2015 Cha .................. G06F 1/1637
345/676

* cited by examiner

*Primary Examiner* — Xuemei Zheng
(74) *Attorney, Agent, or Firm* — Newman Law, LLC

(57) ABSTRACT

A mobile device including various components in communication with one another, the mobile device comprising a flexible housing, flexible display device mounted in the housing, a deformation sensor mounted in the housing and a device controller configured to operate the mobile device responsive to receipt of data input from the flexible display device, wherein the device controller automatically deactivates the processing of at least a portion of data input received of the plurality of data input received from the display device responsive to receiving communication from the deformation sensor detecting a threshold level of deformation of the housing.

12 Claims, 2 Drawing Sheets

MOBILE DEVICE WITH FLEXIBLE DISPLAY AND HOUSING

BACKGROUND OF THE INVENTION

The invention relates generally to mobile electronic devices, such as smartphones and tablets, and more particularly, to mobile electronic devices with improved portability and comfort features.

Mobile electronic devices generally include a housing or body and a display device supported by the body to be accessible on the body surface. The development of technology increasing the functionality of the phone and its components have led to the display has become the primary input/output device. The displays are generally liquid crystal displays mounted under a rigid layer of cover glass. While the cover glass protects the liquid crystal display from damage, the rigid nature of the cover glass and other display layers render the display inflexible.

Larger-sized displays have become more desirable as the use of mobile electronic devices has grown. Many people now use a smartphone for watching videos and viewing pictures instead of a laptop or PC. As displays have grown, the size of the housing has been reduced to attempt to increase the portability of the device. The display most often comprises an entire side of the housing. While the larger sized displays are appealing, the rigid layer on the display effectively renders the entire mobile device inflexible. When the mobile electronic device is smartphone, some flexibility from a mobile device would be desirable, particularly for carrying in a pants pocket.

Accordingly, it would be desirable and there is a need for mobile devices with greater flexibility.

SUMMARY OF THE INVENTION

The invention is generally directed to mobile electronic devices, such as smartphones, which are configured and adapted to be flexible or bendable, that is having a flexible display with a flexible housing that is enabled for bending in multiple dimensions and directions responsive to an applied force and then returning to a rest condition responsive to the cessation of the applied force. In some embodiments, the housing is further constructed of a deformable material.

Some embodiments of the invention are directed to a mobile device including various components in communication with one another, the mobile device comprising: a flexible housing; a flexible display device mounted in the housing, wherein the display device includes a touch-sensitive layer for receiving a plurality of data input; a deformation sensor mounted in the housing, the sensor being configured to detect a threshold level of deformation of the housing; and a device controller configured to operate the mobile device responsive to receipt of data input from the flexible display device, wherein the device controller automatically deactivates the processing of at least a portion of data input received of the plurality of data input received from the display device responsive to receiving communication from the deformation sensor detecting a threshold level of deformation of the housing.

In some embodiments of the aforementioned mobile device the device controller automatically reactivates the processing of the portion of data input received responsive to the deformation sensor ceasing to detect a threshold level of deformation of the housing.

In some embodiments of the aforementioned mobile device the housing is constructed of a material having a known resistance to deformation. In some embodiments, the threshold level of deformation is less than or equal to the known resistance to deformation of the housing material.

Some embodiments of the invention are directed to a mobile device including various components in communication with one another, the mobile device comprising: a flexible housing; a flexible display device mounted in the housing, wherein the display device includes a touch-sensitive layer for receiving a plurality of data input; a deformation sensor mounted in the housing, the sensor being configured to detect a threshold level of deformation of the housing; and a device controller configured to operate the mobile device responsive to receipt of data input from the flexible display device, wherein the device controller automatically deactivates the display device responsive to receiving communication from the deformation sensor indicating at least a threshold level of deformation of the housing.

In some embodiments of the aforementioned mobile device the device controller automatically reactivates the display device responsive to the deformation sensor ceasing to detect a threshold level of deformation of the housing.

In some embodiments of the aforementioned mobile device the device controller is further configured to automatically deactivate the processing of at least a portion of data input received of the plurality of data input received from the display device responsive to receiving communication from the deformation sensor detecting a threshold level of deformation of the housing.

Some embodiments of the invention are directed to a mobile device including various components in communication with one another, the mobile device comprising: a flexible housing; a flexible display device mounted in the housing, wherein the display device includes a touch-sensitive layer for receiving a plurality of data input; a deformation sensor mounted in the housing, the sensor being configured to detect a threshold level of deformation of the housing; and a device controller configured to operate the mobile device responsive to receipt of data input from the flexible display device, wherein the device controller automatically deactivates the processing of at least a portion of data input received of the plurality of data input received from the display device responsive to receiving communication from the deformation sensor detecting a threshold level of deformation of the housing and reactivates the processing of the portion of data input received responsive to the deformation sensor ceasing to detect a threshold level of deformation of the housing.

In some embodiments of the aforementioned mobile device the housing is fabricated of one or more materials from the group of silicone, neoprene rubber, natural gum rubber, latex and vinyl rubber.

In some embodiments of the aforementioned mobile device the flexible display device is formed of one or more materials from the group of flexible organic light-emitting diode (OLED) display, polymer light-emitting diodes (PLEDs), and a display based on a plurality of surface-conduction electron-emitters (SEDs).

In some embodiments of the aforementioned mobile device the deformation sensor comprises a pressure sensor configured to detect pressure applied on the housing.

In some embodiments of the aforementioned mobile device the housing further comprises rigid and flexible zones.

In some embodiments of the aforementioned mobile device the device is one of a smartphone, tablet, television or gaming device.

DETAILED DESCRIPTION OF THE INVENTION

The following detailed description provides exemplary embodiments of flexible and deformable electronic devices. For illustrative purposes, the exemplary embodiments are depicted as smartphones. However, it should be understood that the invention may also be embodied in any portable electronic device or other suitable electronic device, such as a laptop computer, a tablet computer or a media player. A flexible electronic device may be provided with various flexible internal and external elements that allow the device to be flexible. The flexible internal elements may include a flexible display, flexible batteries, flexible circuit boards or other flexible electrical or support elements, some of which may be relatively more or less flexible than other elements, or combinations of flexible and rigid elements, as needed to enable the device to be overall capable of being flexible.

It should be understood that in these embodiments the technology and components for enabling smartphone functionality such as receivers, audio and speaker device, may vary while remaining within the scope of the invention which provides a smartphones capable of being flexed or bent between 0 degrees (at rest, or a planar, non-flexing condition) and about 45 degrees relative to the longitudinal or latitudinal axes or respective planes of the phone, in any direction. In other words, devices, such as device 10 discussed below, is sufficiently flexible and deformable to twist in multiple dimensions responsive to one or more applied forces.

In some embodiments, the applied force is comparable to the force applied to a smartphone in a pocket of a user as the user moves, such as when standing, sitting, walking or running, that is, the device conforms to the contours of a user's body when the user's body is pressed against the device, and possesses sufficiently resiliency to continue functioning and return to a non-flexed rest condition. In general the applied force may be in the range of about 0.0001 Newton to about 20 Newtons.

Figure 1:
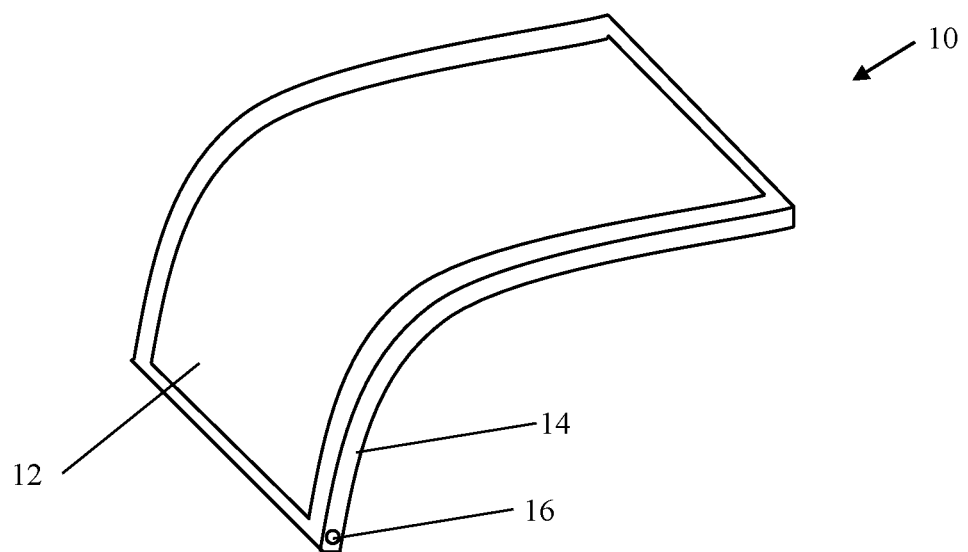
FIGS. 1-3 are perspective views of an illustrative flexible electronic device in accordance with an embodiment of the invention.

FIG. 1 illustrates a smartphone of the invention generally referred to by the reference numeral 10. Smartphone or device 10 includes a flexible display 12. Flexible display 12 may be fabricated of one or more of layers of flexible electronic ink displays, organic light-emitting diode (OLED) display, polymer light-emitting diodes (PLEDs), a display based on a plurality of surface-conduction electron-emitters (SEDs). In certain embodiments, display 12 is a touch-screen coupled to a touch-screen controller or other touch-sensitive display overlay to enable interaction with any images displayed on a display device. It should be appreciated that the display devices may be of any suitable sizes, shapes, and configurations.

In this embodiment, display 12 is a touch-sensitive display. However, the display may include sensors for detecting input such as strain gauge sensors, proximity sensors, piezoelectric sensors or capacitive sensors (sensors measuring force and/or touch events using capacitance measurements), ambient light sensors, touch sensors, force sensors, temperature sensors, pressure sensors, magnetic sensors, accelerometers, gyroscopes and other sensors for measuring orientation (e.g., position sensors, orientation sensors), microelectromechanical systems sensors, and other sensors. Such sensors may measure applied force from a user's fingers or other source of pressure, as well as make capacitance measurements to determine the position of a user's fingers on display 12.

Device 10 includes a housing 14, which may also be referred to as a case. Housing 14 may be formed of one or more of a deformable or elastic material, such as an elastomer or other polymer with viscoelasticity, silicone, neoprene rubber, natural gum rubber, latex, vinyl rubber (PVC), or a rigid material like plastic, glass, ceramics, fiber composites, metal (e.g., stainless steel, aluminum, etc.), other suitable materials, or a combination of these materials. For example, housing 14 may be comprised of portions of rigid materials and flexible materials alternately connected to one another to create a composite casing that can be flexible and deformable in certain locations. Any of these materials may be further encased in a deformable material.

Housing 14 may be provided with features such as speaker ports, microphone ports, connector ports such as illustrative connector port 16, or other structures for accommodating sensors and antennas, or other device features, all of which are mounted to compensate when device 10 is flexed, that is, bent or twisted. Device 10 may also be provided with user interface components (input-output components) such as buttons, microphones, speakers, piezoelectric actuators or (for receiving electrical input from a user or tactile feedback to users). These components may be mounted on device 10 to be accessible from outside housing 14, such as illustrative button 18.

Device 10 may include within housing 14 one or more components, electronics and circuitry collectively and illustratively referred to herein as device control elements 20. Control elements 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory, etc. Processing circuitry in control elements 20 may be used to control the operation of device 10. The processing circuitry may be based on one or more microprocessors, microcontrollers, digital signal processors, baseband processors, power management units, audio chips, application specific integrated circuits, etc. Control elements 20 may be used to run software on device 10 such as an operating system and mobile applications. Control elements 20 is secured and/or mounted on substrates within housing 14 to allow for flexing of device 10 without causing damage or interference to device 10 operations. The mounting of control elements 20 may be in some embodiments on flexible substrates and/or positioned in housing 14 within an outer casing of flexible, resilient and/or deformable material.

In some embodiments, control elements 20 is configured to include one or more dual interconnections or redundant electrical contacts between components, or otherwise includes a greater amount of electrical conductive material at soldered points or connections to accommodate any flexing of the control elements 20 responsive to the bending of device 10.

In some embodiments, electrical signal paths formed by electrically conductive materials within control elements 20, such as carbon, graphene, metals like aluminum or copper wiring, or conductive trace materials, may have segments of electrically conductive materials of a thickness or form, may be mounted with redundancies on a flexible substrate material, or otherwise be configured in a pattern or arrangement, such as a serpentine configuration or other configurations, at least for the purpose of accommodating the flexing of device 10 while maintaining the electrical signal path and avoiding breakage or disconnection.

In some embodiments, the electrically conductive materials and connections, as well as some of the components forming control elements 20, are configured and fabricated with materials that provide an ability for such materials, connections and/or components to be bendable or otherwise sufficiently flex to accommodate the flexibility of device 10.

Figure 2:
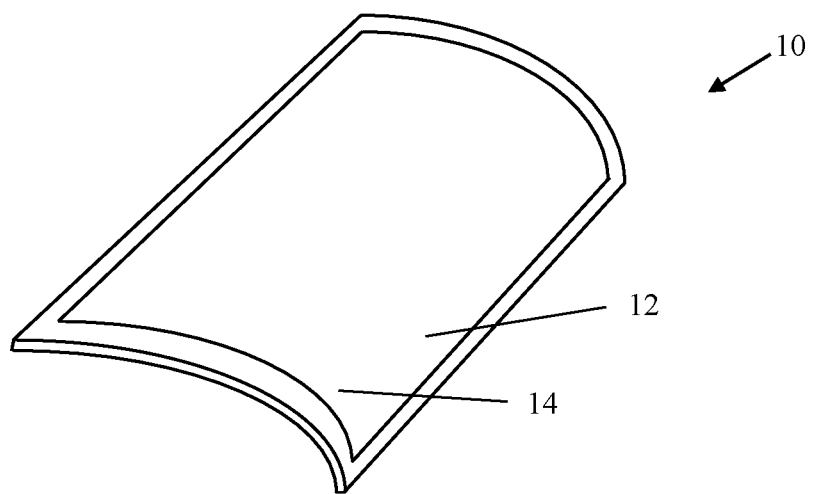
Figure 3:
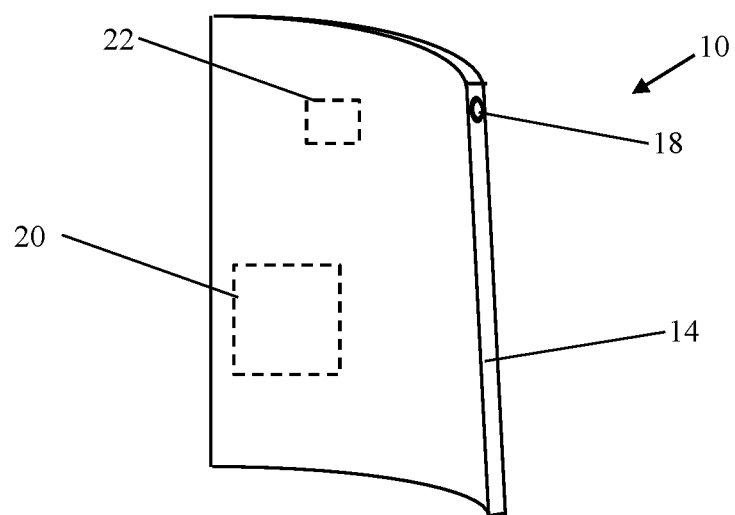

In this embodiment, device 10 also includes a deformation sensor 22 configured to detect flexing or deformations of all or part of the device 10, such as the deformations shown in FIGS. 1-3. In some embodiments, control elements 20 cause device 10 to be automatically rendered inaccessible or locked responsive to detection of a threshold amount of device 10 deformation. To render the device inaccessible control elements 20 may actuate a screen lock or suspend feature responsive to the detection of deformation of device 10. The term inaccessible may refer to a variety of conditions of device 10. For example, device 10 may be made inaccessible as described herein but still be partially or fully responsive to some input and may also receive data and calls. Once device 10 is made inaccessible, a touch or passcode verification to be made accessible again may be required. Alternatively, device 10 may automatically become accessible again or unlock responsive to deformation sensor 22 no longer detecting deformation of device 10, or the conditions which are likely to result in deformation of device 10, such as the detection of an application of a threshold amount of pressure. Threshold amount as referred to herein may be any condition which either results or is likely to result in a deformation or flexing of device 10.

For example, if device 10 is made to bend when in the pocket of a sitting person, device 10 is made inaccessible by the detection of deformation of device 10 received from deformation sensor 22, whereby accidental entries or "butt dialing" (that is, the action of inadvertently calling someone when a mobile phone is the rear pants pocket) can be avoided.

In some embodiments, deformation sensor 22 is a pressure sensor which detects the application of sufficient or threshold amount of pressure on device 10 to cause an expected deformation of device 10. Responsive to sensor 22 detecting sufficient pressure to cause deformation of device 10, device 10 may be locked until less than the threshold amount of pressure is detected.

In general, a device such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims.

Those skilled in the art will appreciate that the precise types of hardware and components used in the device of the invention are not vital to the full implementation of the invention so long as the device, including the housing and display, can be flexed in multiple directions in response to applied forces thereon, and not lose functionality over time.

Although specific features of various embodiments of the invention may be shown in some drawings and not in others, this is for convenience only. In accordance with the principles of the invention, any feature of a drawing may be referenced and/or claimed in combination with any feature of any other drawing.

While exemplary devices, apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth by the claims and any equivalents thereto.

The invention claimed is:

1. A mobile device including various components in communication with one another, the mobile device comprising:
   a flexible housing having a known resistance to deformation;

a flexible display device mounted in the housing, wherein the display device includes a touch-sensitive layer for receiving a plurality of data input;

a deformation sensor mounted in the housing, the sensor being configured to detect a threshold level of deformation of the housing; and a device controller configured to operate the mobile device responsive to receipt of data input from the flexible display device, wherein the device controller automatically deactivates the processing of at least a portion of data input received of the plurality of data input received from the display device responsive to receiving communication from the deformation sensor detecting a threshold level of deformation of the housing, wherein the threshold level of deformation is relative to the known resistance to deformation of the housing.

2. The mobile device of claim 1, wherein the device controller automatically reactivates the processing of the portion of data input received responsive to the deformation sensor ceasing to detect a threshold level of deformation of the housing.

3. The mobile device of claim 1, wherein the threshold level of deformation is less than or equal to the known resistance to deformation of the housing.

4. A mobile device including various components in communication with one another, the mobile device comprising:

a flexible housing having a resistance to deformation;

a flexible display device mounted in the housing, wherein the display device includes a touch-sensitive layer for receiving a plurality of data input;

a deformation sensor mounted in the housing, the sensor being configured to detect a threshold level of deformation of the housing; and a device controller configured to operate the mobile device responsive to receipt of data input from the flexible display device, wherein the device controller automatically deactivates the display device responsive to receiving communication from the deformation sensor indicating at least a threshold level of deformation of the housing, wherein the threshold level of deformation of the housing is less than or about equal to the resistance to deformation of the housing.

5. The mobile device of claim 4, wherein the device controller automatically reactivates the display device responsive to the deformation sensor ceasing to detect a threshold level of deformation of the housing.

6. The mobile device of claim 4, wherein the device controller is further configured to automatically deactivate the processing of at least a portion of data input received of the plurality of data input received from the display device responsive to receiving communication from the deformation sensor detecting a threshold level of deformation of the housing.

7. A mobile device including various components in communication with one another, the mobile device comprising:

a flexible housing;

a flexible display device mounted in the housing, wherein the display device includes a touch-sensitive layer for receiving a plurality of data input;

a deformation sensor mounted in the housing, the sensor being configured to detect a threshold level of deformation of the housing; and a device controller configured to operate the mobile device responsive to receipt of data input from the flexible display device, wherein the device controller automatically deactivates the processing of at least a portion of data input received of the plurality of data input received from the display device responsive to receiving communication from the deformation sensor detecting a threshold level of deformation of the housing and reactivates the processing of the portion of data input received responsive to the deformation sensor ceasing to detect a threshold level of deformation of the housing.

8. The mobile device of claim 7, wherein the housing is fabricated of one or more materials from the group of silicone, neoprene rubber, natural gum rubber, latex and vinyl rubber.

9. The mobile device of claim 7, wherein the flexible display device is formed of one or more materials from the group of flexible organic light-emitting diode (OLED) display, polymer light-emitting diodes (PLEDs), and a display based on a plurality of surface-conduction electron-emitters (SEDs).

10. The mobile device of claim 7, wherein the deformation sensor comprises a pressure sensor configured to detect pressure applied on the housing.

11. The mobile device of claim 7 wherein the housing further comprises rigid and flexible zones.

12. The mobile device of claim 7, wherein the device is one of a smartphone, tablet, television or gaming device.

* * * * *